(12) United States Patent
Shimizu et al.

(10) Patent No.: US 9,098,223 B2
(45) Date of Patent: Aug. 4, 2015

(54) JOB INFORMATION DISPLAY DEVICE

(71) Applicant: KONICA MINOLTA, INC., Chiyoda-ku (JP)

(72) Inventors: Hideaki Shimizu, Hachioji (JP); Yasuaki Sugimoto, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/207,692

(22) Filed: Mar. 13, 2014

(65) Prior Publication Data

US 2014/0293329 A1    Oct. 2, 2014

(30) Foreign Application Priority Data

Mar. 29, 2013 (JP) ................. 2013-071464

(51) Int. Cl.
  *G06F 3/12* (2006.01)
  *G06T 11/60* (2006.01)
  *G06T 11/00* (2006.01)

(52) U.S. Cl.
  CPC ............ *G06F 3/1259* (2013.01); *G06F 3/1207* (2013.01); *G06F 3/1292* (2013.01); *G06T 11/00* (2013.01); *G06T 11/60* (2013.01)

(58) Field of Classification Search
  USPC ........ 358/1.15, 1.14; 382/100, 154, 266, 291, 382/294; 701/3; 345/8, 633
  See application file for complete search history.

(56) References Cited

U.S. PATENT DOCUMENTS

| 2003/0227542 | A1* | 12/2003 | Zhang et al. ................. 348/61 |
| 2004/0189675 | A1* | 9/2004 | Pretlove et al. ............... 345/633 |
| 2006/0221098 | A1* | 10/2006 | Matsui et al. ................. 345/633 |
| 2007/0024644 | A1* | 2/2007 | Bailey ........................... 345/633 |
| 2010/0142826 | A1* | 6/2010 | Kotake et al. ................. 382/203 |
| 2012/0026530 | A1* | 2/2012 | Tsongas et al. .............. 358/1.14 |

FOREIGN PATENT DOCUMENTS

| JP | 2003-125123 A | 4/2003 |
| JP | 2008-201101 | 9/2008 |
| JP | 2011-245792 | 12/2011 |
| JP | 2012-029164 | 2/2012 |
| JP | 2012-156872 A | 8/2012 |

OTHER PUBLICATIONS

Office Action issued in corresponding Japanese Patent Application No. 2013-071464, issued Feb. 3, 2015, and English translation thereof.
Notification of Reasons for Refusal issued in corresponding Japanese Patent Application No. 2013-071464, mailed Apr. 28, 2015, and English translation thereof. (12 pages).

* cited by examiner

*Primary Examiner* — Allen H Nguyen
(74) *Attorney, Agent, or Firm* — Buchanan Ingersoll & Rooney PC

(57) ABSTRACT

Disclosed is a job information display device, including: an AR display unit configured to display an augmented reality space in which an image is overlapped with a real space viewed by a user; a recognition unit configured to recognize an image forming apparatus which exists in the real space viewed by the user; an information obtaining unit configured to obtain job information indicating an execution state of a job input to the image forming apparatus recognized by the recognition unit; and a control unit configured to instruct the AR display unit to display the augmented reality space in which the execution state of the job is indicated by a virtual paper on a paper passage of the image forming apparatus in which the job is executed, in accordance with the job information obtained by the information obtaining unit.

13 Claims, 11 Drawing Sheets

JOB INFORMATION DISPLAY DEVICE

BACKGROUND OF THE INVENTION

1. Field of the Invention

The present invention relates to a job information display device which displays the execution state of a job in an image forming apparatus.

2. Description of Related Art

When a job is input to a printer which is connected to a network and is shared by a plurality of users, the timing at which the execution of the job is completed is variously changed depending on the state and the like of each preceding job accumulated in the printer. Therefore, one user might go to a paper discharge tray in order to confirm whether the document is printed in accordance with one user's job. However, there is some possibility that another user's job is executed before one user's job is executed, and even if one user goes to the paper discharge tray, one user's printed document might not be output. Further, one user cannot find out whether one user's printed document is output or not, until one user confirms the contents of the printed documents which are accumulated in the paper discharge tray. Therefore, when another user's document is printed, the user views another user's printed document. To solve the above problem, various types of technologies for informing the user of the execution state of each job in the printer have been proposed.

For example, the following job management device is disclosed (See Japanese Patent Application Publication No. 2003-125123). In the job management device, on a display unit of a UI device which is integrally provided on a printer or which is provided via a network, a job list in which a job which is currently executed by the intended printer and jobs waiting to be processed are listed, is displayed. The job management device accepts the cancellation and the like of the selected job.

In addition, the following technology is disclosed (See Japanese Patent Application Publication No. 2012-156872). In the technology, when a multi function peripheral is shot by using a mobile phone, the display information is displayed on the mobile phone in accordance with the shot portion of the multi function peripheral. For example, in case that a sheet conveying unit of the multi function peripheral is shot by using the mobile phone when the jam is caused, the portion in which the jam is caused is displayed so as to be overlapped with the multi function peripheral in the shot image.

In case of the method for displaying the job list on the display unit of the UI device which is integrally provided on a printer or which is provided via a network, under the conditions in which a plurality of printers exists in an office, the user cannot immediately grasp the printer which executes the user's job. Further, in case that the user's job for printing the document on only one sheet of paper is executed between jobs for printing the documents on a large number of sheets of paper, it is difficult for the user to accurately grasp the timing at which the user's job is executed. Further, in the job list in which texts are arranged, it is difficult for the user to viscerally grasp the execution state of the user's job.

In the technology of Japanese Patent Application Publication No. 2012-156872, the portion in which the jam is caused, and the like can be viscerally recognized. However, in case that there are a plurality of jobs waiting to be executed, the information for indicating the timing at which the user's job is executed is not provided.

SUMMARY

To achieve at least one of the abovementioned objects, a job information display device reflecting one aspect of the present invention comprises:

an AR display unit configured to display an augmented reality space in which an image is overlapped with a real space viewed by a user;

a recognition unit configured to recognize an image forming apparatus which exists in the real space viewed by the user;

an information obtaining unit configured to obtain job information indicating an execution state of a job input to the image forming apparatus recognized by the recognition unit; and a control unit configured to instruct the AR display unit to display the augmented reality space in which the execution state of the job is indicated by a virtual paper on a paper passage of the image forming apparatus in which the job is executed, in accordance with the job information obtained by the information obtaining unit.

Preferably, the control unit instructs the AR display unit to display the virtual paper corresponding to the job input by the user of the job information display device so as to be distinguished from the virtual paper corresponding to the job input by another user.

Preferably, the control unit differentiates a color of the virtual paper corresponding to the job input by the user of the job information display device from a color of the virtual paper corresponding to the job input by the another user.

Preferably, the control unit differentiates a shape of the virtual paper corresponding to the job input by the user of the job information display device from a shape of the virtual paper corresponding to the job input by the another user.

Preferably, the control unit instructs the AR display unit to display the virtual paper so as to identify a border between the jobs.

Preferably, the control unit instructs the AR display unit to display the virtual paper corresponding to the job waiting to be processed, so as to be overlapped with a paper feed tray of paper used in the job.

Preferably, the control unit instructs the AR display unit to display information indicating number of sheets used for printing in the job waiting to be processed, by adding the information indicating the number of the sheets to the virtual paper corresponding to the job waiting to be processed.

Preferably, in case that there are a plurality of the jobs waiting to be processed in the image forming apparatus, the control unit instructs the AR display unit to display the virtual papers corresponding to the jobs waiting to be processed, so as to arrange the virtual papers in an order of an execution of the jobs waiting to be processed.

Preferably, the control unit instructs the AR display unit to display the virtual paper corresponding to the job in which printing is completed, so as to be overlapped with a paper discharge tray or so as to be positioned near the paper discharge tray.

Preferably, the control unit deletes the virtual paper corresponding to the job in which the printing is completed, after predetermined time elapses since an execution of the job is completed.

Preferably, the control unit instructs the AR display unit to display a virtual paper passage which virtually indicates the paper passage of the image forming apparatus.

Preferably, the job information display device is a head-mounted display device.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENT

Hereinafter, a preferred embodiment of the present invention will be explained with reference to the accompanying drawings.

Figure 1:
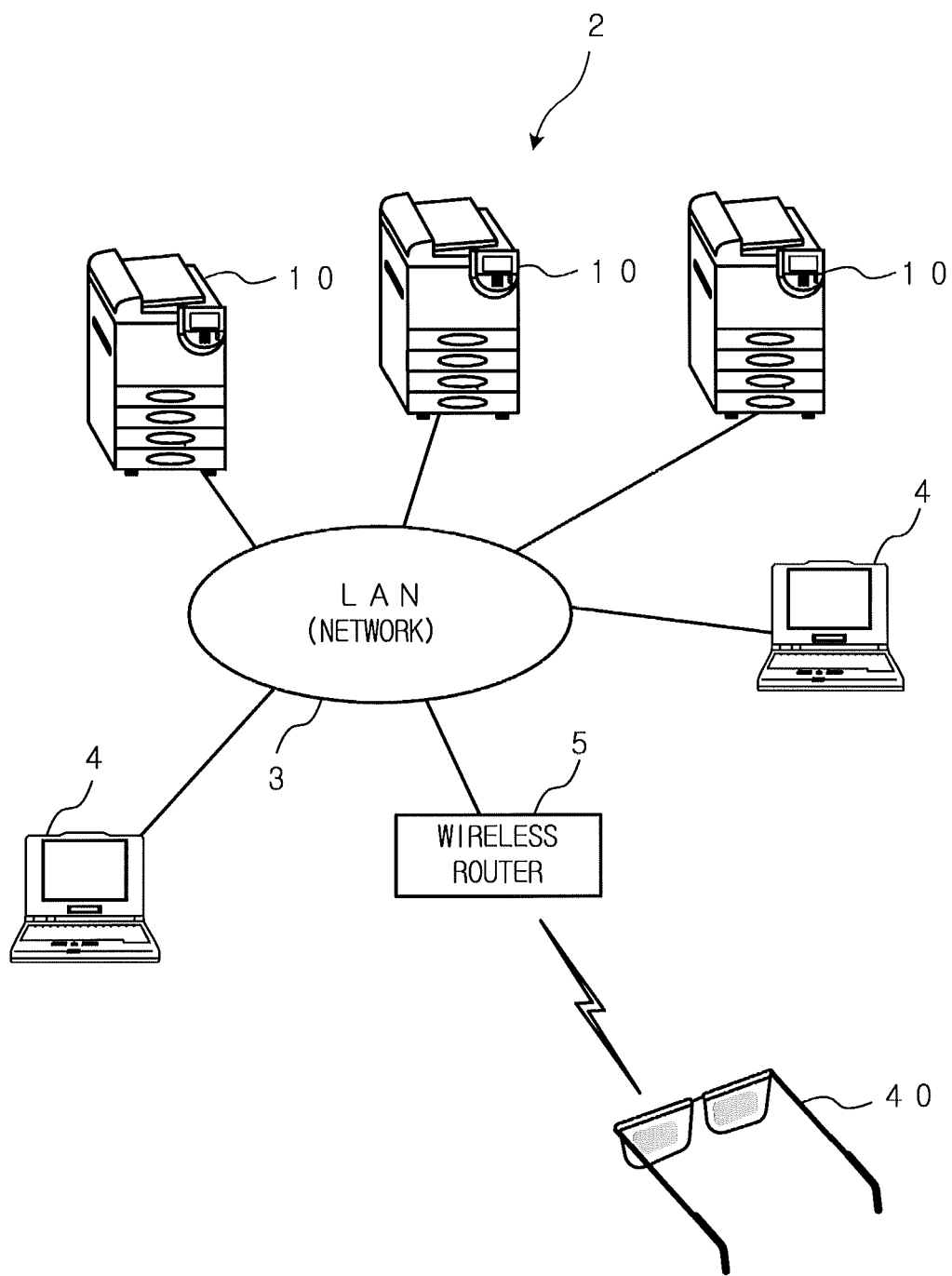
FIG. 1 is a view showing a configuration example of an information system in which the job information display device according to the embodiment is used.

FIG. 1 shows a configuration of an information system 2 in which the job information display device according to the embodiment is used. The information system 2 is configured by connecting one or a plurality of image forming apparatuses 10 installed in an office or the like, PCs (personal computers) 4, a wireless router 5, a head-mounted display (HMD) device 40 as the job information display device which displays the execution state of each job in the image forming apparatuses 10, and the like to a network 3 such as a LAN (Local Area Network). The head-mounted display device 40 is connected to the wireless router 5 by the wireless communication, and further to the network 3 via the wireless router 5.

The image forming apparatus 10 is a so-called multi function peripheral (MFP) having a copy function of printing an image of an original on the recording paper by optically reading the original, a scan function of obtaining image data by reading an original to store the image data as a file or to transmit the image data to an external terminal via the network 3, and a printer function of printing out an image by forming the image on the recording paper in accordance with the print data received from the PC 4 or the like via the network 3. As long as the image forming apparatus 10 has at least the printer function, the image forming apparatus 10 is not required to have the other functions.

The head-mounted display device 40 includes a camera unit 52 (refer to FIG. 4) which carries out the shooting of a scene (real space) viewed by a user. The head-mounted display device 40 analyzes an image obtained by the camera unit 52 and recognizes the image forming apparatus 10 which exists in the scene viewed by the user. Further, the head-mounted display device 40 communicates with the recognized image forming apparatus 10 and obtains the information (job information) indicating the execution state of each job input to the image forming apparatus 10. Further, in accordance with the obtained job information, the head-mounted display device 40 creates an image indicating the execution state of the job and displays an augmented reality space in which the created image is overlapped with the image forming apparatus 10 in the scene (real space) viewed by the user.

Specifically, the execution state of each job is indicated by displaying the virtual paper which virtually indicates the paper used in the job, on the position of the paper passage, which corresponds to the execution state ("waiting", "processing", and "completed") of the job. For example, when the execution state is "waiting" (waiting to be processed), the virtual paper is displayed on the position of the paper feed tray which is a part of the paper passage. When the execution state is "processing" (currently processed), the virtual paper is displayed on the conveyance path of the paper passage. When the execution state is "completed", the virtual paper is displayed on the position of the paper discharge tray which is a part of the paper passage. The virtual paper is displayed by graphics, characters, or the like.

Figure 2:
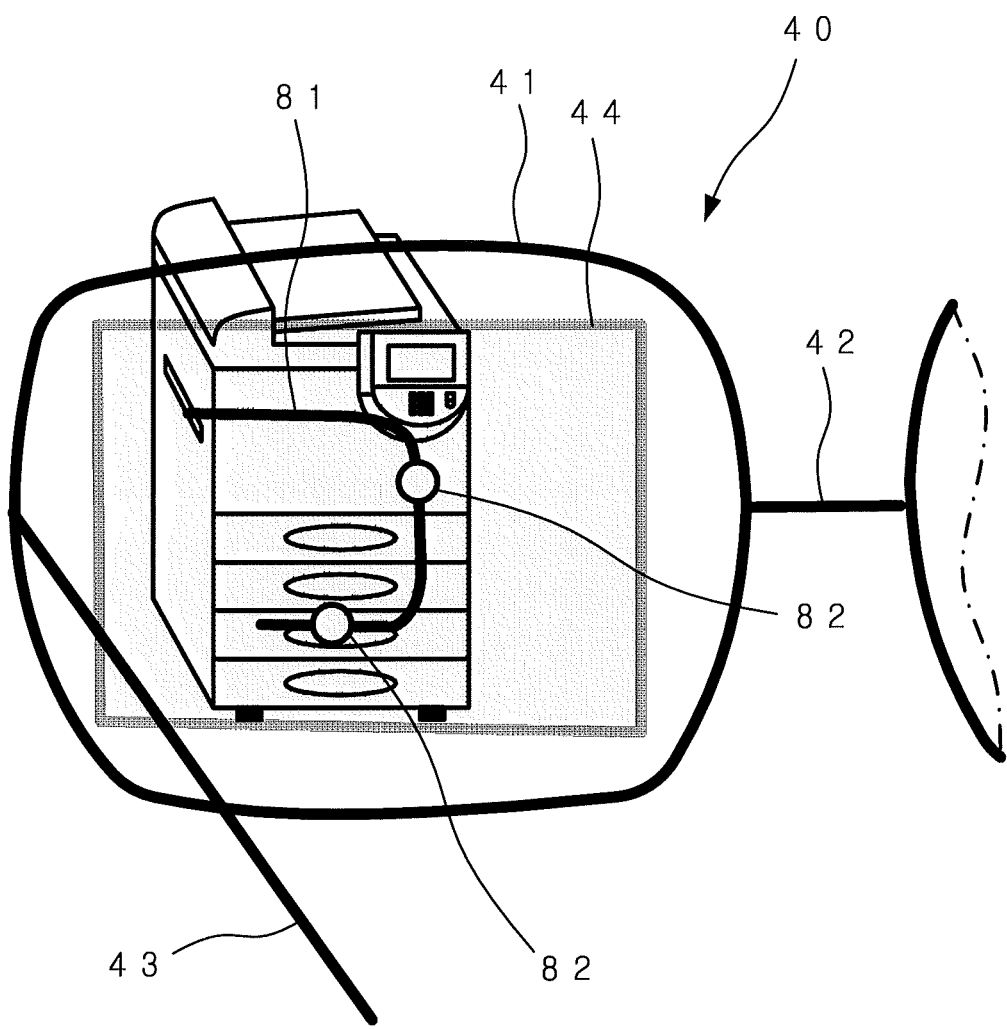
FIG. 2 is a view showing a display example which is displayed when a user who wears a head-mounted display device views an image forming apparatus.

FIG. 2 shows one example of the display state (augmented reality space) which is generated when the user who wears the head-mounted display device 40 views the image forming apparatus 10. The head-mounted display device 40 is used by being mounted on the user's head like eye glasses. The head-mounted display device 40 comprises transmission units 41 corresponding to lenses of the eye glasses, which are arranged in front of the user's right and left eyes, respectively when the user wears the head-mounted display device 40, a bridge 42 for connecting between the right and left transmission units 41, and temples 43 which extend in the same direction from each end portion of the right and left transmission units 41 and which are put on the user's ears.

In the head-mounted display device 40, the method in which only the image of the portion to be virtually displayed is overlapped with the real scene viewed by the user (so-called light transmission type) is adopted. The user views the real world through the transmission units 41. On each transmission units 41, a semi-transparent display screen unit 44 which can display the image is provided. By overlapping the optional image with the scene of the real world, the augmented reality space is shown to the user. That is, the display screen unit 44 has the function of the AR (Augmented Reality) display unit which displays the augmented reality space in which the image is overlapped with the real space viewed by the user.

FIG. 2 shows one example of the state where a virtual paper passage 81 in which the paper passage is virtually indicated and each image of virtual papers 82 in which the paper is virtually indicated, are displayed on the display screen units 44 on the transmission units 41 of the head-mounted display device 40 so as to be overlapped with the image forming apparatus 10 in the real world.

Figure 3:
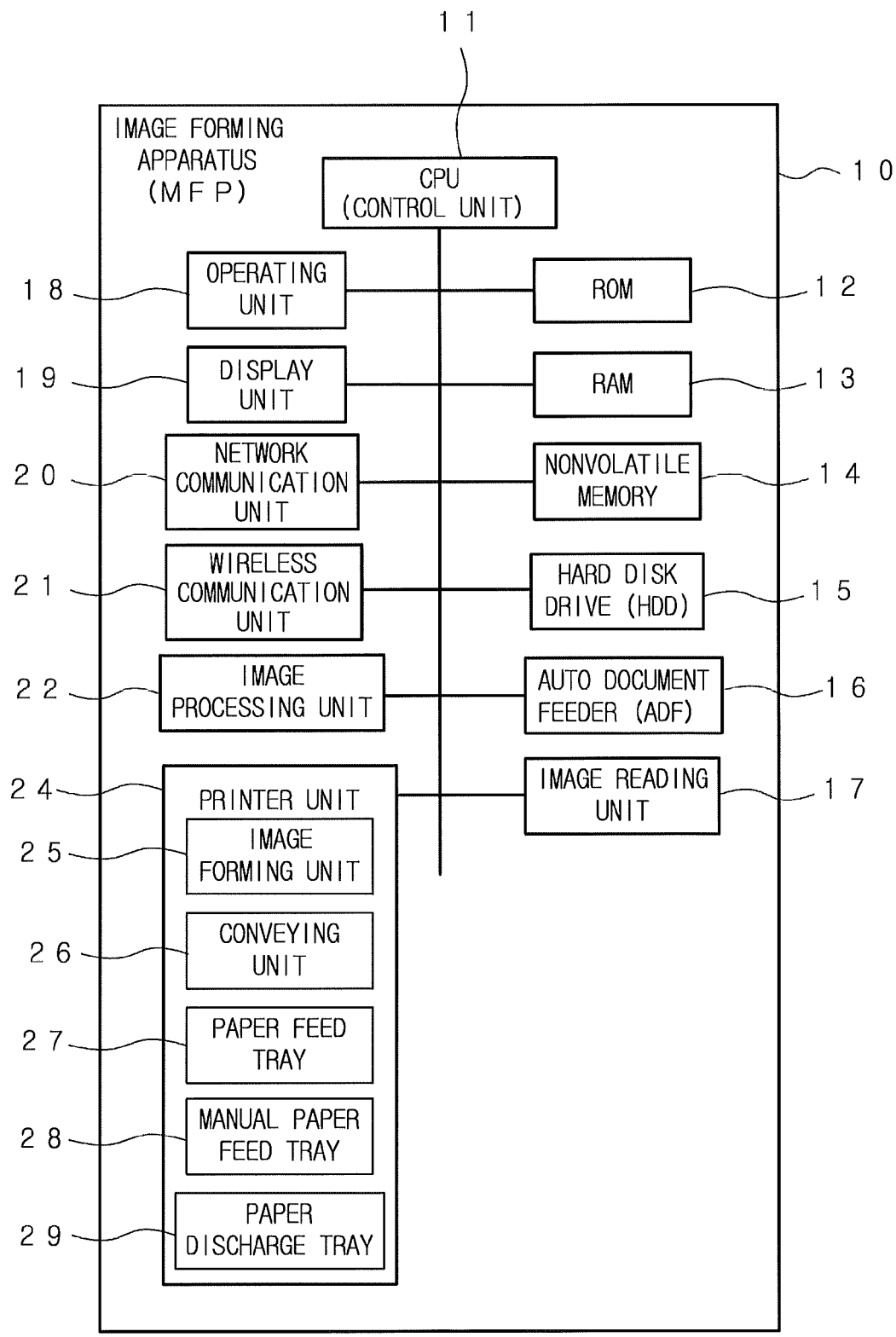
FIG. 3 is a block diagram showing the electrical schematic configuration of the image forming apparatus.

FIG. 3 is the block diagram showing the schematic configuration of the image forming apparatus 10. The image forming apparatus 10 comprises a CPU (Central Processing Unit) 11 for controlling the entire operation of the image forming apparatus 10. The CPU 11 is connected with a ROM (Read Only Memory) 12, a RAM (Random Access Memory) 13, a nonvolatile memory 14, a hard disk drive 15, an auto document feeder (ADF) 16, an image reading unit 17, an operating unit 18, a display unit 19, a network communication unit 20, a wireless communication unit 21, an image processing unit 22, a printer unit 24, and the like via a bus.

By the CPU 11, a middleware, application programs, and the like are executed on an OS (Operating System) program as a base. In the ROM 12, various types of programs are stored. By carrying out various types of processes by the CPU 11 in accordance with these programs, each function of the image forming apparatus 10 is realized.

The RAM 13 is used as a work memory for temporarily storing various data when the CPU 11 carries out the process in accordance with the programs, and an image memory for storing image data.

The nonvolatile memory 14 is a memory (flash memory) in which the stored contents are not damaged even if the image forming apparatus 10 is turned off. The nonvolatile memory 14 is used for storing various types of setting information, and the like. The hard disk drive 15 is a large-capacity nonvolatile storing device. In the hard disk drive 15, various hypes of programs and data are stored in addition to print data, image data, and the like.

The image reading unit 17 has a function of obtaining image data by optically reading an image of an original. The image reading unit 17 comprises, for example, a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The auto document feeder 16 has a function of feeding the original set to the document feed tray from the top page sheet by sheet, passing the original through the reading position of the image reading unit 17 and discharging the original to the predetermined discharge position.

The operating unit 18 and the display unit 19 constitute the operation panel which receives an operation, such as the input of a job and the like, from the user. The display unit 19 is configured by a liquid crystal display (LCD) and the like and has a function of displaying various types of operation windows, setting windows, and the like. The operating unit 18 comprises various types of operation switches, such as a start button and the like, and a touch panel provided on a physical screen of the display unit 19. The touch panel detects a coordinate position on which the physical screen of the display unit 19 is contacted by using a touch pen, a user's finger, or the like.

The network communication unit 20 has a function of communicating with external devices, such as the PCs 4, other servers and the like via the network 3 such as a LAN or the like. The network communication unit 20 has also a function as a wireless LAN. The image forming apparatus 10 receives the input of the job from the PC 4 or the like via the network communication unit 20. Further, the wireless communication unit 21 has a function of wirelessly communicating with the head-mounted display device 40 and the like.

The image processing unit 22 carries out the rasterizing process for converting print data into image data, the compression/decompression process for the image data, and the like in addition to the processings, such as the enlargement/reduction or the rotation of image data.

The printer unit 24 has a function of forming an image on the paper in accordance with the image data. The printer unit 24 comprises an image forming unit 25 which forms an image on the paper, a conveying unit 26 which conveys the paper, and the like. The image forming unit 25 comprises, for example, a photoconductive drum, a charging device, a laser unit, a developing device, a transfer and separation device, a cleaning device, a fixing device, and the like. The image forming unit 25 forms an image by the electrophotographic process. The conveying unit 26 feeds the paper to be used for the printing from a paper feed tray 27, a manual paper feed tray 28, or the like for containing many sheets of paper, and conveys the paper so as to be discharged to a paper discharge tray 29 via the image forming unit 25.

When the image forming apparatus 10 receives the request to obtain the job information from the head-mounted display device 40, the CPU 11 creates the job information indicating the execution state of each job input to the image forming apparatus 10. The network communication unit 20 has a function of transmitting the created job information to the head-mounted display device 40 via the network 3 and the wireless router 5. Alternatively, the wireless communication unit 21 may directly transmit the job information to the head-mounted display device 40. In the present embodiment, each piece of job information relating to the job waiting to be processed, the job which is currently processed, and the job in which the predetermined time does not elapse since the processing for the job is completed, is created and is transmitted to the head-mounted display device 40. Each piece of job information includes the apparatus ID, the apparatus type of the image forming apparatus 10, the job ID, the job type, the user ID of the user who inputs the job, the job state (waiting, processing or completed), the paper feed tray number, the paper discharge tray number, and the total number of pages. Further, in case of the job waiting to be processed, the processing order (information indicating the order of each job from the job which is firstly processed, among the jobs waiting to be processed) is included. In case of the job which is currently processed, the page number of the page which is currently processed and the positional information for indicating the position of the paper on the paper passage, which is used for printing the image on the above page, is included. In case of the completed job, the information for indicating the time at which the processing is completed, is included.

The head-mounted display device 40 previously stores the layout information indicating the layout of the paper passage, the positions of the paper feed tray and the paper discharge tray and the like in each apparatus type. Further, in accordance with the information relating to the apparatus type included in the job information obtained from the image forming apparatus 10, the head-mounted display device 40 specifies the layout information corresponding to the image forming apparatus 10, and recognizes the paper passage, the number of the paper feed trays and each position of the paper feed trays.

Figure 4:
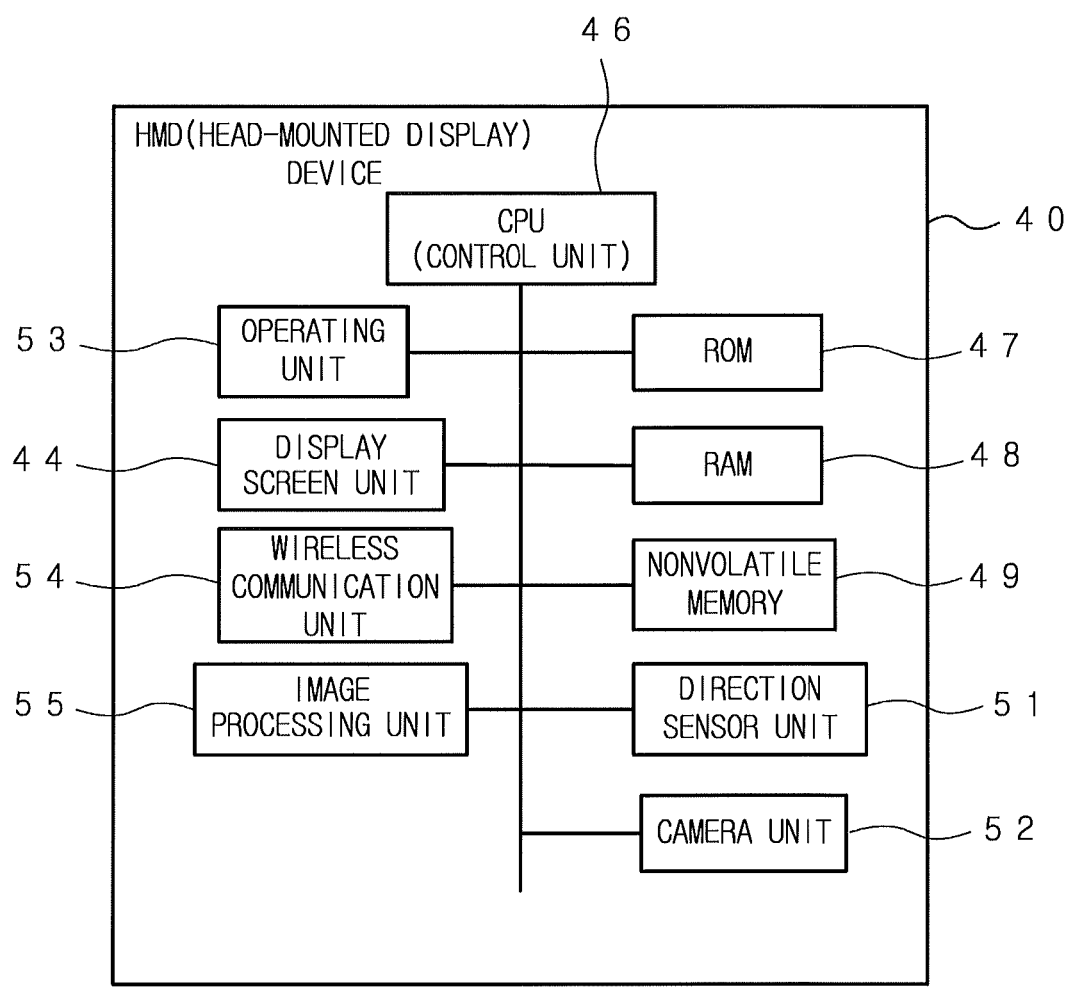
FIG. 4 is a block diagram showing the electrical schematic configuration of the head-mounted display device.

FIG. 4 shows the electrical schematic configuration of the head-mounted display device 40. The head-mounted display device 40 comprises a CPU 46 which functions as the control unit, a ROM 47, a RAM 48, a nonvolatile memory 49, a direction sensor unit 51, a camera unit 52, an operating unit 53, the above-described display screen units 44, a wireless communication unit 54, an image processing unit 55, and the like, which are connected with the CPU 46 via a bus.

The CPU 46 controls the operations of the head-mounted display device 40 in accordance with the programs stored in the ROM 47. Further, the CPU 46 has the function as the recognition unit which recognizes the image forming apparatus which exists in the real space viewed by the user. Further, in accordance with the job information obtained by the wireless communication unit 54, the CPU 46 has the function as the control unit which instructs the display screen units 44 to display the augmented reality space. The augmented reality space will be described in detail later. In the ROM 47, programs and fixed data are stored. The RAM 48 is used as a work memory which temporarily stores various types of data when the CPU 46 executes programs. In the nonvolatile memory 49, various types of setting information are stored. In addition, the nonvolatile memory 49 stores the above-described layout information.

The direction sensor unit 51 detects the direction and the posture of the head-mounted display device 40 and the change in the direction and the posture. The direction sensor unit 51 comprises a plurality of geomagnetic sensors and a plurality of acceleration sensors so as to combine them. The direction sensor unit 51 detects the posture of the user who wears the head-mounted display device 40, the direction in which the user faces, and the angle at which the user faces (the direction and the angle which are detected by the direction sensor unit 51 are coincident with the shooting direction and the shooting angle of the camera unit 52). Further, in case that the head-mounted display device 40 is inclined, the direction sensor unit 51 detects the direction and the speed of the motion of the head-mounted display device 40. Then, the direction sensor unit 51 transmits the detection result to the CPU 46. In accordance with the detection result transmitted from the direction sensor unit 51, the CPU 46 recognizes the posture of the user who wears the head-mounted display device 40, the angle of the head-mounted display device 40, and the direction and the speed of the motion of the head-mounted display device 40, which is caused by inclining the head-mounted display device 40.

The camera unit 52 carries out the shooting in the front direction of the head-mounted display device 40 (a scene viewed by the user). In detail, the camera unit 52 carries out the shooting in the range which is substantially the same as the user's field of view in case that the user looks forward. The camera unit 52 takes the movie, and obtains the images, for example, at 30 frames per second.

The operating unit 53 comprises several switches and the like, and is used for the adjustment of the brightness and the like of the image displayed on the display screen units 44.

The wireless communication unit 54 has a function of wirelessly communicating with the wireless router 5 and transmitting and receiving various types of information to/from the image forming apparatus 10 via the wireless router 5 and the network 3. Alternatively, the wireless communication unit 54 may directly transmit and receive various types of information to/from the wireless communication unit 21 of the image forming apparatus 10. Further, the wireless communication unit 54 has the function as the information obtaining unit which obtains the information (job information) indicating the execution state of the job input to the image forming apparatus 10 recognized by the CPU 46, from the wireless router 5 or the like. The wireless communication unit 54 may perform the near field communication with the image forming apparatus 10.

The image processing unit 55 carries out the enlargement/reduction, the deformation or the like of the image which is displayed on the display screen units 44.

Next, the method in which the CPU 46 of the head-mounted display device 40 recognizes the image forming apparatus 10 in the shot image of the camera unit 52 will be described.

In order to display the augmented reality space indicating the virtual paper 82, the virtual paper passage 81, and the like so as to be overlapped with the image forming apparatus 10 on the display screen units 44 of the head-mounted display device 40, it is necessary to specify the position of the image forming apparatus 10 in the scene viewed by the user. In the present embodiment, the method for recognizing the position of the image forming apparatus 10 by using specific marks 91 (refer to FIG. 5) as a marker, will be described.

Figure 5:
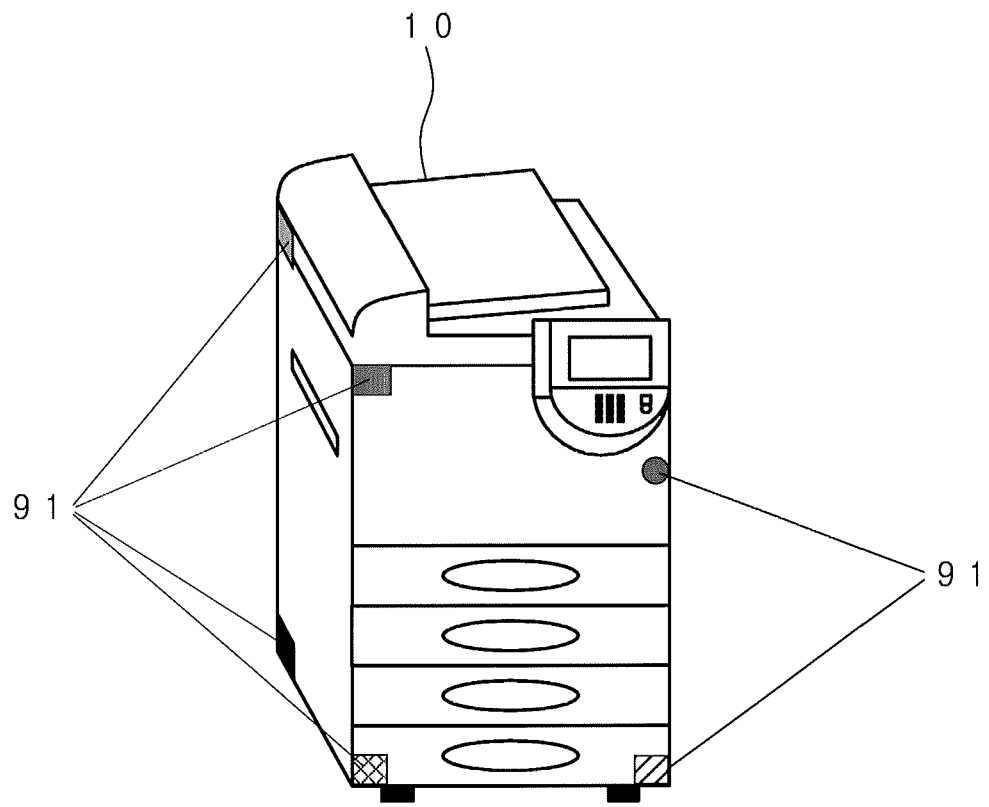
FIG. 5 is a view showing one example of the image forming apparatus to which the specific marks are added.

FIG. 5 shows one example of the image forming apparatus 10 to which the specific marks 91 are added. The CPU 46 of the head-mounted display device 40 detects the specific marks 91 in the image shot by the camera unit 52 by analyzing the image. There are several types of the specific marks 91, and the specific marks 91 are distinguished from each other by shapes, colors, and patterns, respectively.

In order to precisely specify the position and the direction of the image forming apparatus 10, preferably, two or more specific marks 91 are detected with respect to one image forming apparatus 10. In accordance with each size of the detected specific marks 91 or the positional relationship among a plurality of the detected specific marks 91, the CPU 46 of the head-mounted display device 40 specifies the position, the distance (the size) and the direction of the image forming apparatus 10, and determines the drawing position of the augmented reality space and the like to be overlapped with the image forming apparatus 10.

The specific marks 91 are desirably provided on the four sides of the image forming apparatus 10 so as to find at least two specific marks 91 even if the image forming apparatus 10 is viewed from any direction. In addition to the above method, without using the image analysis, the CPU 46 may specify the position of the image forming apparatus 10 by using a predetermined sensor.

Further, in case that a plurality of intended image forming apparatuses 10 exist, the identification data for uniquely specifying each of the image forming apparatuses 10, is added to the specific marks 91 and the like. For example, the specific marks 91 to be provided on the first image forming apparatus 10 and the specific marks 91 to be provided on the second image forming apparatus 10 are different in colors or shapes. Thereby, the CPU 46 can uniquely specify each of the image forming apparatuses 10, that is, can specify the apparatus ID of each of the image forming apparatuses 10 in the image.

Next, the flowchart of the process in which the head-mounted display device 40 displays the execution state of each job will be described.

Figure 6:
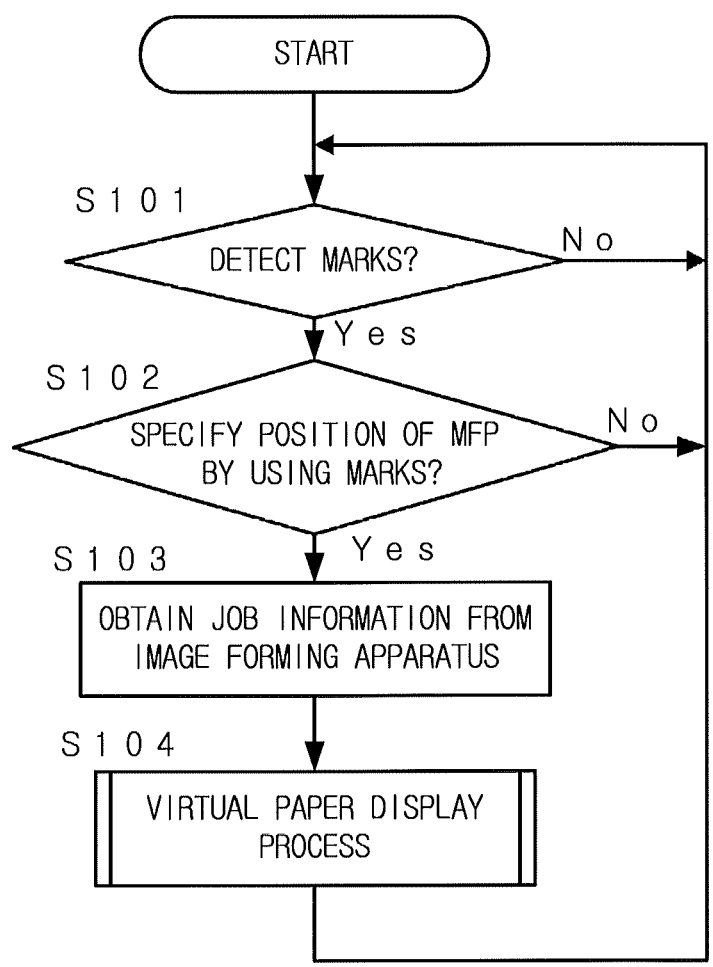
FIG. 6 is a flowchart showing an outline of the process in which the image forming apparatus is recognized by using the specific marks and the execution state of each job in the image forming apparatus is displayed by using the virtual paper.

FIG. 6 shows the flowchart of the process in which the image forming apparatus 10 is recognized by using the above-described specific marks 91 and the execution state of each job in the recognized image forming apparatus 10 is displayed by using the virtual paper.

The CPU 46 of the head-mounted display device 40 carries out the image processing for the image shot by the camera unit 52 to analyze the image, and detects the above-described specific marks 91 (Step S101). In case that the specific marks 91 are not detected (Step S101; No), the CPU 46 repeats the process for detecting the specific marks 91.

When the specific marks 91 are detected (Step S101; Yes), the CPU 46 determines whether the position and the like of the image forming apparatus 10 can be specified by using the detected specific marks 91 (Step S102). For example, when two or more specific marks 91 are detected with respect to one image forming apparatus 10, the CPU 46 determines that the position and the like of the image forming apparatus 10 can be specified. On the other hand, when only one specific mark 91 is detected with respect to one image forming apparatus 10, the CPU 46 determines that the position and the like of the image forming apparatus 10 cannot be specified.

When the position and the like of the image forming apparatus 10 are not specified by using the specific marks 91 (Step S102; No), the process returns to Step S101 and is continued.

When the CPU 46 specifies the positions and the like of one or more image forming apparatuses 10 by using the specific marks 91, that is, when the CPU 46 recognizes the image forming apparatus 10 which exists in the real space viewed by the user (Step S102; Yes), the wireless communication unit 54 obtains the job information from each image forming apparatus 10 of which the position is specified (Step S103). For example, when the user sits on a seat which is relatively far from the image forming apparatus 10, there are some cases in which two or more image forming apparatuses 10 exist in the scene viewed by the user (the user's field of view). In these cases, the wireless communication unit 54 obtains the job information from each of the image forming apparatuses 10 which exist in the scene viewed by the user.

In this embodiment, the CPU 46 of the head-mounted display device 40 recognizes the apparatus ID of each image forming apparatus 10 of which the position and the like are specified, in accordance with the identification data (color, shape or the like) added to the specific marks 91. Further, the wireless communication unit 54 transmits the request to obtain the job information to the image forming apparatus 10 having the recognized apparatus ID. The image forming apparatus 10 which receives the request to obtain the job information, creates the above-described job information relating to each job (the job waiting to be processed, the job which is currently processed, and the job in which the predetermined time does not elapse since the processing for the job is completed) input to the image forming apparatus 10, and transmits the job information to the head-mounted display device 40.

The CPU 46 of the head-mounted display device 40 which receives the job information from the image forming apparatus 10 performs the virtual paper display process for displaying the virtual paper and the like indicating the execution state of each job in accordance with the job information, so as to be overlapped with the corresponding image forming apparatus 10 in the scene viewed by the user (Step S104). In the virtual paper display process, mainly, the CPU 46 instructs the display screen units 44 to display the augmented reality space in which the execution state of each job is indicated by using the virtual paper on the paper passage of the image forming apparatus 10 in which the job is executed, in accordance with the job information obtained by the wireless communication unit 54. Then, the process returns to Step S101 and is continued. By repeating the process, the augmented reality space is displayed so as to sequentially reflect the current execution state of each job. For example, the situation in which the virtual paper moves on the virtual paper passage is displayed like a moving image.

Figure 7:
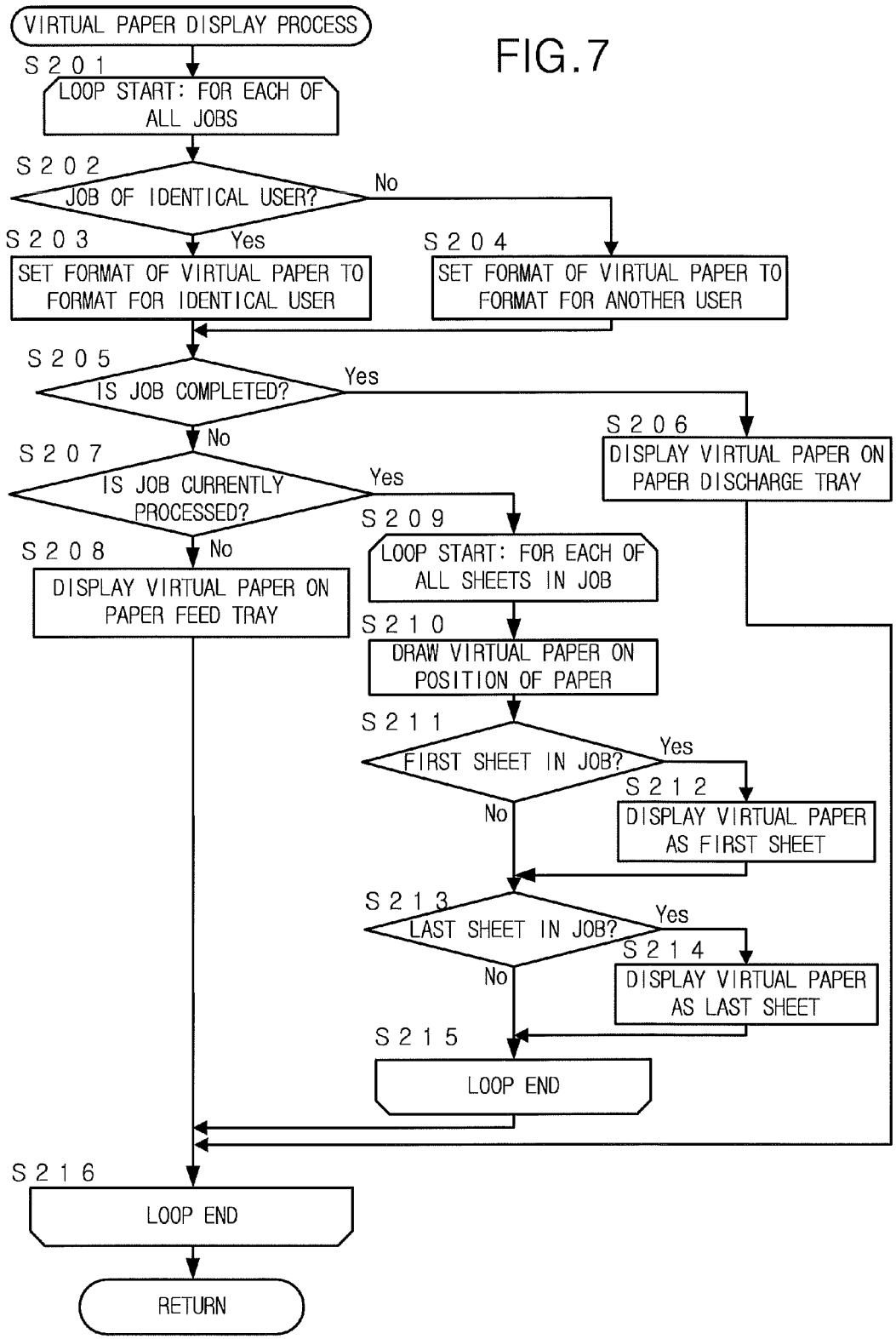
FIG. 7 is a flowchart showing the detail of the virtual paper display process (Step S104 of FIG. 6)

FIG. 7 shows the detailed flowchart of the virtual paper display process (Step S104 of FIG. 6). FIG. 7 shows the process for the job information received from one image forming apparatus 10. In case that a plurality of intended image forming apparatuses 10, the process of FIG. 7 is performed with respect to each of the image forming apparatuses 10.

Because there are some cases in which the job information relating to a plurality of jobs is received from one image forming apparatus 10, the process between Step S201 and Step S216 is performed for each of all the job information received from the image forming apparatus 10. Firstly, it is determined whether the job corresponding to the intended job information (hereinafter, referred to as "intended job") is the job of the identical user which is identical to the user of the head-mounted display device 40 (the user who wears the head-mounted display device 40) (Step S202). The user ID of the user who wears the head-mounted display device 40 is registered in the head-mounted display device 40. Further, by judging whether the above registered user ID is matched with the user ID included in the job information received from the image forming apparatus 10, it is determined whether the intended job is the identical job. In any case, the virtual paper passage 81 is displayed so as to be overlapped with the corresponding image forming apparatus 10.

In case that the intended job is the job of the identical user (Step S202; Yes), the format of the virtual paper is set to the format for the identical user (Step S203). Then, the process proceeds to Step S205. In case that the intended job is not the job of the identical user (Step S202; No), the format of the virtual paper is set to the format for another user (Step S204). Then, the process proceeds to Step S205. That is, the CPU 46 instructs the display screen units 44 to display the virtual paper corresponding to the job input by the user who wears the head-mounted display device 40 so as to be distinguished from the virtual paper corresponding to the job input by another user.

In Step S205, the CPU 46 determines whether the execution state of the intended job is "completed". In case that the execution state of the intended job is "completed" (Step S205; Yes), the CPU 46 instructs the display screen units 44 to display the virtual paper on the position of the paper discharge tray 29 corresponding to the paper discharge tray number of the corresponding image forming apparatus 10, which is specified by the intended job (Step S206). Then, the process is ended (return). One virtual paper corresponds to one job. That is, the CPU 46 instructs the display screen units 44 to display the virtual paper corresponding to the job in which the printing is completed, so as to be overlapped with the paper discharge tray 29.

Figure 11:
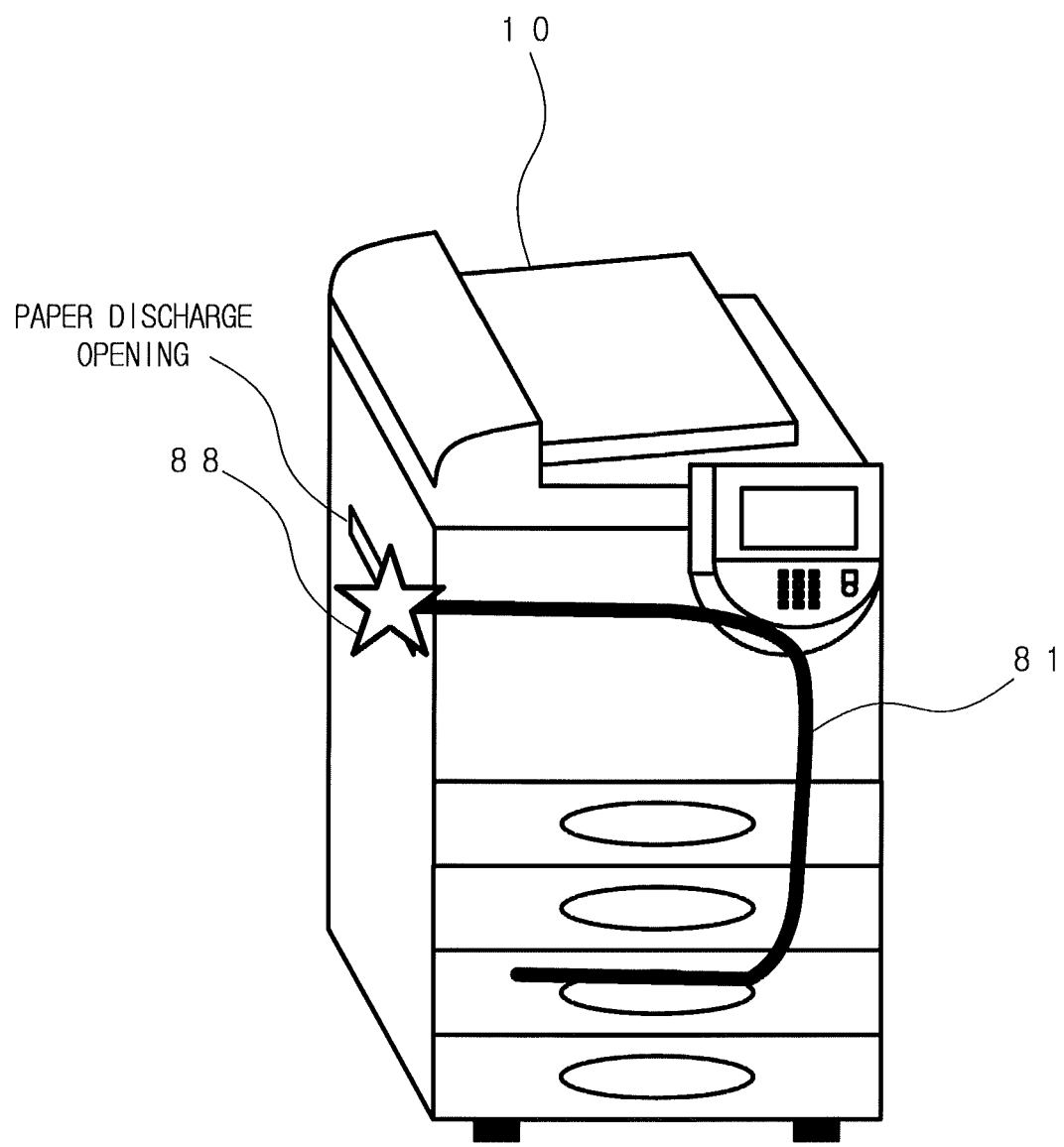
FIG. 11 is a view showing one example in which the virtual paper corresponding to the completed job is displayed.

The head-mounted display device 40 deletes the virtual paper 88 (refer to FIG. 11) corresponding to the "completed" job when the fixed time (for example, 3 seconds) elapses since the display of the virtual paper 88 is started. That is, the CPU 46 deletes the virtual paper corresponding to the job in which the printing is completed, after the predetermined time elapses since the execution of the job is completed. The image forming apparatus 10 does not detect whether the paper discharged to the paper discharge tray 29 is taken out. Therefore, the image forming apparatus 10 cannot delete the virtual paper 88 displayed on the position of the paper discharge tray 29, at the timing at which the paper corresponding to the virtual paper 88 is taken out from the paper discharge tray 29. In order to solve the above trouble, the virtual paper 88 which is displayed so as to be overlapped with the paper discharge tray 29 is deleted after the fixed time elapses since the virtual paper 88 is displayed. In place of the paper discharge tray 29, the virtual paper may be displayed near the paper discharge opening of the main body of the image forming apparatus 10. That is, the CPU 46 may instruct the display screen units 44 to display the virtual paper corresponding to the job in which the printing is completed, near the paper discharge tray 29. The method for displaying the virtual paper near the paper discharge opening is effective in case that the paper discharge tray is not specified as the destination for discharging the paper, and the like. FIG. 11 shows one example in which the virtual paper 88 corresponding to the "completed" job is displayed near the paper discharge opening.

In case that the execution state of the intended job is not "completed" (Step S205; No), the CPU 46 determines whether the intended job is the job which is currently processed in the image forming apparatus 10 (Step S207). In case that the intended job is not the job which is currently processed (Step S207; No), the intended job is the job waiting to be processed. In this case, the virtual paper is displayed on the position of the paper feed source (the paper feed tray 27 or the manual paper feed tray 28) corresponding to the paper feed tray number specified by the intended job (Step S208). Then, the process is ended (return). One virtual paper corresponds to one job. That is, the CPU 46 instructs the display screen units 44 to display the virtual paper corresponding to the job waiting to be processed, so as to be overlapped with the paper feed tray of the paper used in the job.

In case that the intended job is the job which is currently processed (Step S207; Yes), the process between Step S209 and Step S215 is performed for each of all sheets of paper used in the intended job which is currently processed.

Firstly, the virtual paper is drawn on the position of the intended paper (Step S210). The page number of the intended paper is defined as P1, and the page number of the page which is currently processed and is indicated as "processing" in the job information is defined as P2. In case that P2 is larger than P1 (P2>P1), because the intended paper has been already processed, the virtual paper corresponding to the intended paper is displayed on the position of the paper discharge tray 29 corresponding to the paper discharge tray number specified by the intended job. At this time, the amount of the discharged paper (the number of sheets of discharged paper) may be indicated by using the numerical value, the size of the virtual paper, the height of the stacked paper discharged to the paper discharge tray 29, or the like.

When P2 is equal to P1 (P2=P1), the intended paper is currently processed to form the image and exists on the conveyance path of the paper passage. Therefore, the positional information indicating the position of the intended paper which is used for printing the image on the page having the page number of P1 and which exists on the conveyance path of the paper passage, is obtained from the job information. Then, the virtual paper is displayed on the position corresponding to the intended paper.

When P1 is larger than P2 (P1>P2), because the intended paper is the paper waiting to be processed, the virtual paper corresponding to the intended paper is displayed on the position of the paper feed source in which the intended paper is contained. At this time, the amount of the unprocessed pages (the number of sheets of unprocessed paper) may be indicated by using the numerical value, the size of the virtual paper, the height of the stacked paper which has not been processed in the intended job, or the like.

Next, the CPU 46 determines whether the intended paper is the first sheet used in the intended job (Step S211). In case that the intended paper is not the first sheet (Step S211; No), the process proceeds to Step S213. In case that the intended paper is the first sheet (Step S211; Yes), the identification data indicating the first sheet is added to the virtual paper corresponding to the intended paper and the virtual paper is displayed (Step S212). Then, the process proceeds to Step S213. For example, the character "S" is displayed in the graphics indicating the virtual paper, and the virtual paper is displayed so as to identify the intended paper as the first sheet.

In Step S213, the CPU 46 determines whether the intended paper is the last sheet used in the intended job. In case that the intended paper is not the last sheet (Step S213; No), the process proceeds to Step S215. In case that the intended paper is the last sheet (Step S213; Yes), the identification data indicating the last sheet is added to the virtual paper corresponding to the intended paper and the virtual paper is displayed (Step S214). Then, the process proceeds to Step S215. For example, the character "E" is displayed in the graphics indicating the virtual paper, and the virtual paper is displayed so as to identify the intended paper as the last sheet.

In case of the job which is currently processed, it is not necessary to display the virtual paper on the position of the paper discharge tray or the paper feed tray. In this case, when the indication, such as "m/n" (m is the page number of the intended page, and n is the total number of pages), is added to the virtual paper displayed on the paper passage, the progress of the intended job can be indicated.

Figure 8:
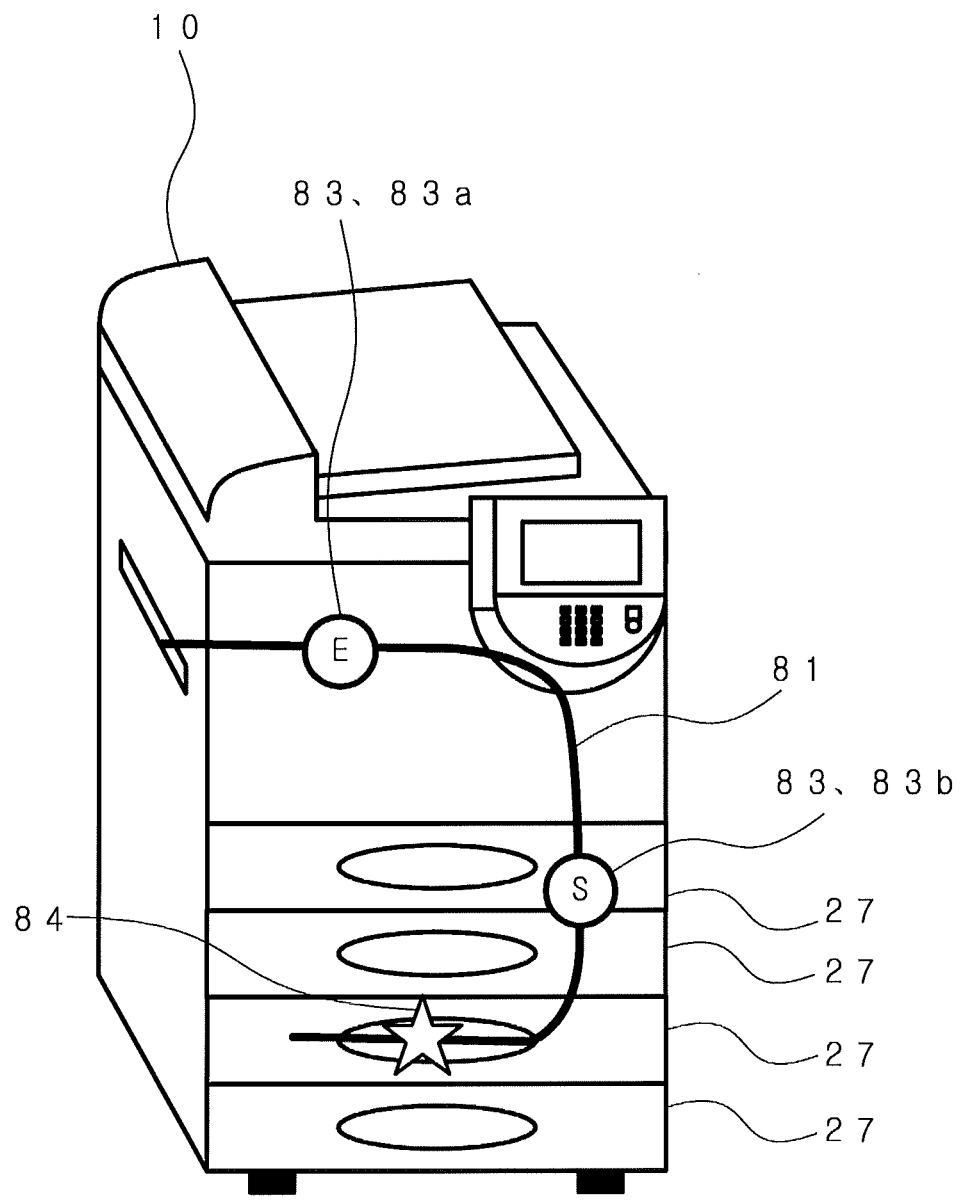
FIG. 8 is a view showing an example in which the virtual paper corresponding to the first sheet and the virtual paper the last sheet are displayed so as to be distinguished from the other virtual papers.

FIG. 8 shows the display example in which the virtual paper corresponding to the first sheet and the virtual paper corresponding to the last sheet are displayed on the paper passage. The virtual paper passage 81 virtually indicates the paper passage of the image forming apparatus 10. The CPU 46 instructs the display screen units 44 to display the virtual paper passage 81 on the position of the paper passage of the image forming apparatus 10. The circular virtual papers 83 indicate the virtual papers corresponding to the jobs input by other users. The star-shaped virtual paper 84 indicates the virtual paper corresponding to the job input by the identical user. That is, the CPU 46 differentiates the shape of the virtual paper corresponding to the job input by the user who wears the head-mounted display device 40 from the shape of the virtual paper corresponding to the job input by another user. Further, the CPU 46 may differentiates the color of the virtual paper corresponding to the job input by the user who wears the head-mounted display device 40 from the color of the virtual paper corresponding to the job input by another user. In the example of FIG. 8, the virtual paper 83a corresponding to the last page of the first job input by another user and the virtual paper 83b corresponding to the first page of the second job input by another user are displayed on the virtual paper passage 81. Thereby, the end of the job is recognized. Instead of displaying the virtual papers so as to identify both of the first page and the last page, the virtual papers may be displayed so as to identify only one of the first page and the last page. Also in this case, the end of the job is recognized. Further, by differentiating the colors or the shapes between the virtual papers corresponding to the adjacent jobs, the virtual papers may be displayed so as to recognize the end of the job. That is, the CPU 46 instructs the display screen units 44 to display the virtual paper so as to identify the border between the jobs.

Figure 9:
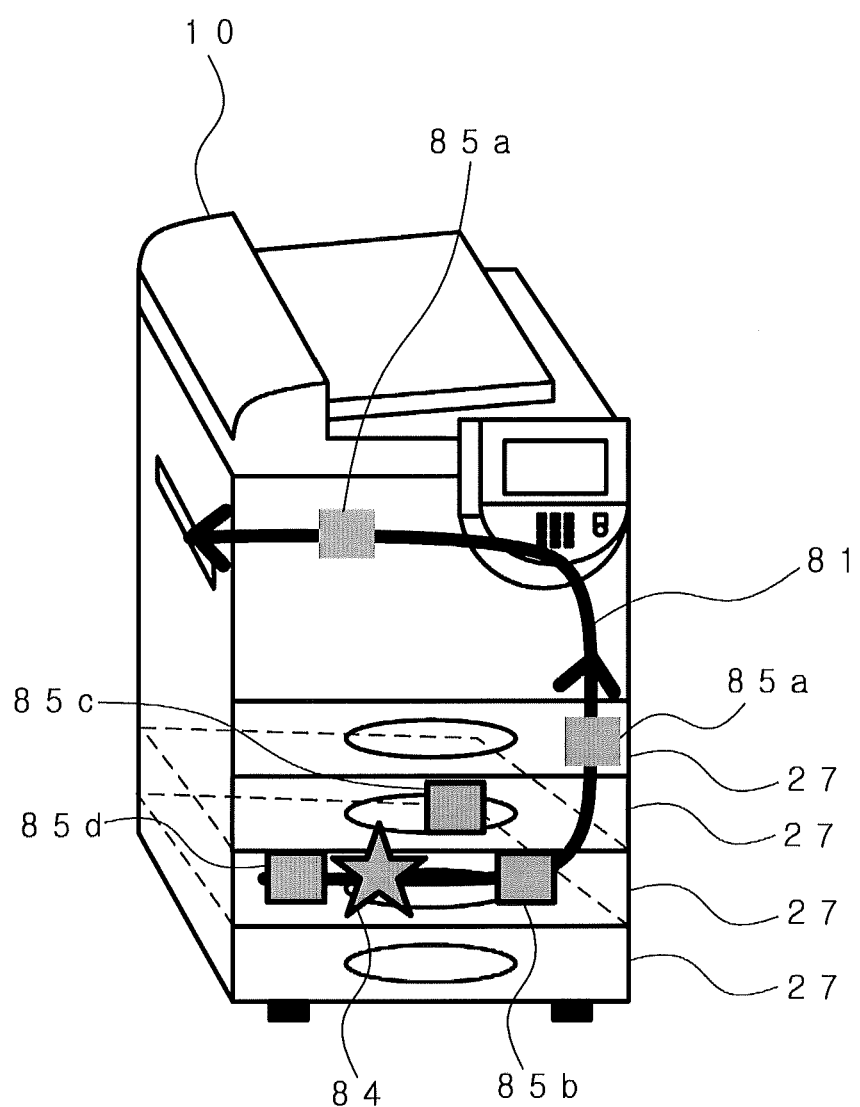
FIG. 9 is a view showing a display example in case that there are a plurality of jobs waiting to be processed.

FIG. 9 shows the display example in case that there are a plurality of jobs waiting to be processed. In FIG. 9, each virtual paper having the frame line indicates the unit of the job. Each of the virtual papers 84, 85b, 85c and 85d, which is displayed so as to be overlapped on the position of the corresponding paper feed tray 27, has the frame line and indicates the unit of the job. Each virtual paper 85a corresponding to the page which is currently processed, which is displayed on the virtual paper passage 81, has no frame line and corresponds to one sheet of paper. Further, the star-shaped virtual paper is the virtual paper 84 corresponding to the job input by the identical user, and the rectangular virtual papers are the virtual papers 85a, 85b, 85c and 85d corresponding to the jobs input by other users.

The virtual papers 84, 85b, 85c and 85d corresponding to the jobs waiting to be processed, are displayed in the order of the execution of the jobs from right to left (the virtual paper corresponding the job which is executed prior to the other jobs waiting to be processed, is displayed on the right side) so as to be overlapped with the corresponding paper feed tray 27.

Each of the virtual papers 84, 85b, 85c, and 85d, which corresponds to the job waiting to be processed, is displayed so as to be overlapped with the paper feed tray 27 corresponding to the paper feed tray number specified by each job. In the example of FIG. 9, the virtual paper 85c corresponding to the second job in the order of the execution is displayed so as to be overlapped with the paper feed tray 27 which is different from the paper feed tray 27 on which the virtual papers 84, 85b, and 85d corresponding to the other jobs waiting to be processed are displayed. In accordance with the display as shown in FIG. 9, the user who wears the head-mounted display device 40 can confirm that his/her job is the third job among the jobs waiting to be processed, and that the paper feed tray used in his/her job is positioned in the third stage from the top, at a glance. That is, in case that there are a plurality of jobs waiting to be processed in the image forming apparatus 10, the CPU 46 instructs the display screen units 44 to display the virtual papers corresponding to the jobs so as to arrange the virtual papers in the order of the execution of the jobs.

Figure 10:
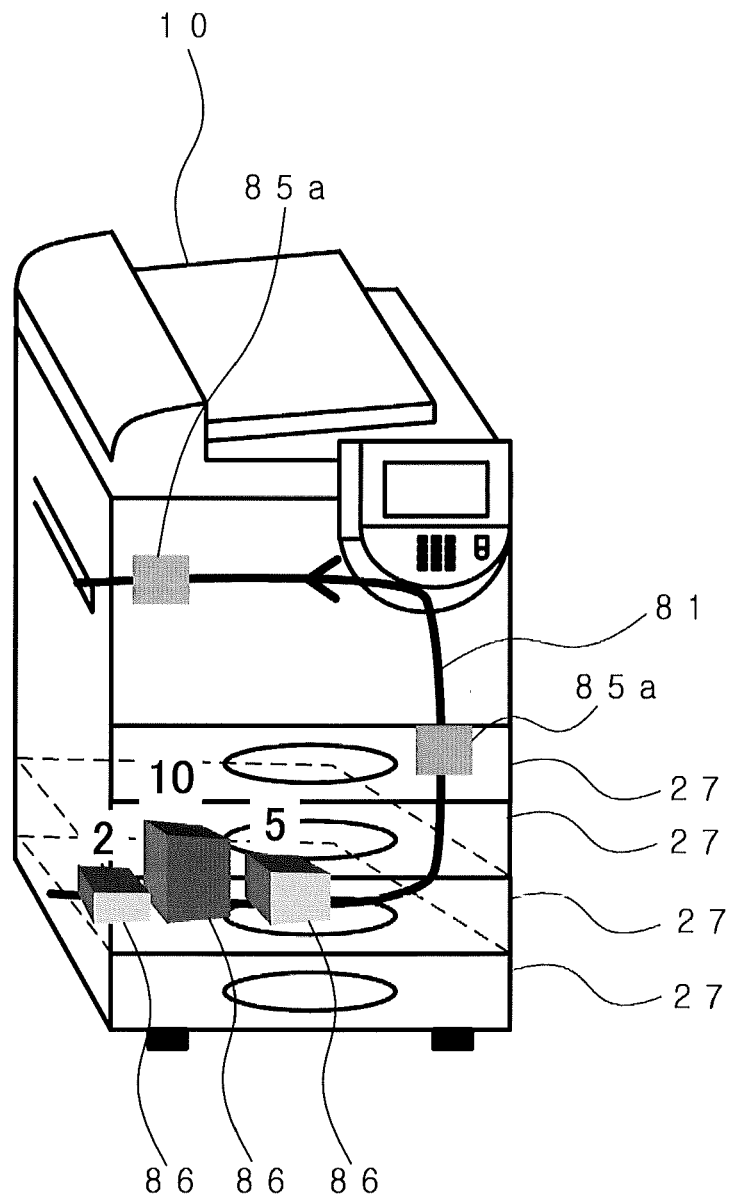
FIG. 10 is a view showing a display example for indicating the amount of jobs (the number of sheets used for the printing) waiting to be processed.

In FIG. 10, each virtual paper 86 which is displayed so as to be overlapped with the paper feed tray 27 indicates the unit of the job, and is displayed so as to have the height proportional to the amount of jobs (the number of sheets used for the printing) (like a vertical bar graph). Further, the numerical value indicating the number of sheets used for the printing in the job is added to each virtual paper 86 corresponding to the job waiting to be processed. The amount of jobs may be indicated by using the form other than the bar graph. Further, the amount of jobs may be indicated by using only one of the display form of the virtual paper (the height or the like) and the numerical value. That is, the CPU 46 instructs the display screen units 44 to display the information indicating the number of sheets used for the printing in the job waiting to be processed, by adding the above information to the virtual paper corresponding to the job.

As described above, by using the head-mounted display device 40 according to the present embodiment, the user can promptly and easily confirm the execution state of the job in each image forming apparatus 10 from a distance. For example, in case that a plurality of image forming apparatuses 10 are provided in one place of an office, when a plurality of image forming apparatuses 10 are viewed from the user's distant seat by wearing the head-mounted display device 40, the virtual paper for the user is displayed so as to be overlapped with the image forming apparatus 10 in which the user's job is executed. As a result, the user can grasp the image forming apparatus 10 in which his/her job is executed, at a glance on the actual image forming apparatus 10. Because the virtual paper is displayed so as to be overlapped with the actual image forming apparatus 10, the user can easily recognize the image forming apparatus 10 in which the printed document is output, and the actual place of the image forming apparatus 10 as compared to the case in which the user is informed of the image forming apparatus 10 as the output destination by displaying the apparatus ID or the like.

For example, in case that the user transmits the job to a print server and the print server allocates the job to one of a plurality of image forming apparatuses 10, the user can clearly recognize the image forming apparatus 10 in which his/her job is executed, by specifying the actual image forming apparatus 10 as described above.

Further, in case that the user's job is a job waiting to be processed, the virtual paper for the user is displayed so as to be overlapped on the position of the paper feed tray which is the paper feed source of the paper used in the user's job. Therefore, the user can accurately recognize the paper feed tray in which the paper to be supplied is required, and can supply the paper to the paper feed tray.

Further, the virtual paper corresponding to one user's job waiting to be processed and the virtual paper corresponding to another user's job waiting to be processed are displayed in the order of the execution of the jobs so as to be overlapped with the paper feed tray. Therefore, one user can recognize the timing at which one user goes to the image forming apparatus 10 to take out the document printed in accordance with one user's job, at a glance.

In case of the job which is currently processed, the virtual paper corresponding to each page is displayed on the paper passage (by updating the displayed virtual paper, the virtual paper is displayed so as to move in accordance with the movement of the paper on the actual paper passage). Therefore, for example, in case that one user's job for printing the document on only one sheet of paper is executed between other users' jobs for mass printing, one user can confirm the situation in which the paper used in one user's job moves on the paper passage and is processed, in real time by displaying the movement of the virtual paper. As a result, when one sheet of document printed in accordance with one user's job is discharged, one user can go to the image forming apparatus 10 to take out the printed document. Further, the user can easily take out one sheet of printed document from the paper discharge tray.

In particular, because the information indicating the end of the job is added to the virtual paper, the end of the job can be easily recognized. Because the user watches the image forming apparatus 10 carefully only at the timing of the end of the job, the user's burden of waiting and watching the discharge of the output document carefully is relieved. Further, because the end of the job is recognized, even though a plurality of jobs are successively input by other users or a plurality of the jobs are successively input by one user, one user can clearly recognize the border between the jobs.

Further, because the situation in which the virtual paper sequentially moves on the paper passage is displayed, the user can viscerally recognize that the image forming apparatus 10 normally operates. Conversely, when the movement of the virtual paper is stopped, the user can recognize that the trouble is caused in the image forming apparatus 10 from the displayed virtual paper.

Further, in case that there are a plurality of image forming apparatuses 10, the user can viscerally recognize the processing speed of each image forming apparatus 10 by viewing the situation in which the virtual paper moves on the paper passage. Accordingly, only by wearing the head-mounted display device 40 and viewing the image forming apparatus 10 from a distance, the user can viscerally recognize the amount of jobs waiting to be processed or the processing speed of the image forming apparatus 10 at a glance. Further, the user can easily determine the image forming apparatus 10 to which the user's job is input.

As described above, the embodiment is described by using the drawings. However, in the present invention, the concrete configuration is not limited to the above embodiment. In the present invention, various modifications of the above embodiment or the addition of various functions or the like to the embodiment can be carried out without departing from the gist of the invention.

In the embodiment, the virtual paper passage 81 is displayed as the preferred embodiment. However, it is not required to display the virtual paper passage 81. Further, the display form of the virtual paper is not limited to the display form exemplified in the embodiment.

In the embodiment, the example in which the head-mounted display device 40 obtains the job information from the image forming apparatus 10 directly or via the wireless router 5 is shown. For example, the head-mounted display device 40 may be configured so as to obtain the job information from a server which collectively manages the execution state of each job.

The job information display device may be configured as the head-mounted display device 40 which obtains the job information from the image forming apparatus 10 and displays the virtual paper and the like. Alternatively, the job information display device may be configured as a system including the image forming apparatus 10 which has a function of transmitting the job information and the head-mounted display device 40. In case that the job information display device is configured as the system, the functions of the job information display device may be optionally shared between the head-mounted display device 40 and the image forming apparatus 10. For example, the functions may be shared as follows. The head-mounted display device 40 transmits the image shot by the camera unit 52 to the image forming apparatus 10. The image forming apparatus 10 receiving the image creates an image to be displayed so as to match the position of the virtual paper and the like with the image forming apparatus 10 in accordance with the job information, and transmits the created image to the head-mounted display device 40. Further, the head-mounted display device 40 displays the received image on the display screen units 44.

In the embodiment, the virtual paper and the like are displayed by the head-mounted display device 40. However, the virtual paper may be displayed, for example, by using a mobile phone having a camera. In this case, the virtual paper and the virtual paper passage may be displayed so as to be overlapped with the image forming apparatus 10 in the image shot by the camera.

One of the objects of the above embodiment is to provide a job information display device in which the user can easily confirm the execution state of the user's job.

In the above embodiment, the execution state of the job input to the image forming apparatus which exists in the scene (real space) viewed by the user is displayed as the augmented reality space in which the virtual paper is overlapped with the paper passage of the image forming apparatus in the real space. The virtual paper is formed in a shape corresponding to the paper used in each job and is displayed so as to be overlapped on the current position of the paper used in the job on the paper passage. Only the virtual paper corresponding to the job input by the user who wears the job information display device may be displayed. Alternatively, the virtual papers corresponding to all the jobs, which include the virtual papers corresponding to the jobs input by the other users, may be displayed.

In the above embodiment, the virtual paper corresponding to the job input by the user who wears the job information display device and the virtual paper corresponding to the job input by another user are displayed so as to be distinguished from each other. A method for distinguishing the virtual papers may be arbitrary.

In the above embodiment, the information indicating the first sheet and the last sheet in the job is added to the virtual paper. Alternatively, the colors or the shapes are differentiated between the virtual papers corresponding to the adjacent jobs. As a result, the border between the jobs can be identified.

In the above embodiment, in case that there are a plurality of paper feed trays in the image forming apparatus, the virtual paper corresponding to the job waiting to be processed is displayed so as to be overlapped on the position of the paper feed tray specified as the paper feed source in the job.

In the above embodiment, the amount of printing in the job waiting to be processed can be easily recognized.

In the above embodiment, the order of the execution of the jobs corresponding to the virtual papers can be easily recognized.

According to the job information display device, only by watching the image forming apparatus, the virtual paper in which the execution state of the job is virtually indicated is displayed so as to be overlapped with the paper passage of the image forming apparatus in the real space. Therefore, the user can easily confirm the execution state of the job from a distance (for example, from his/her seat in an office).

The present U.S. patent application claims the priority of Japanese Patent Application No. 2013-71464, filed on Mar. 29, 2013, according to the Paris Convention, and the entirety of which is incorporated herein by reference for correction of incorrect translation.

What is claimed is:

1. A job information display device, comprising:
an AR display unit configured to display an augmented reality space in which an image is overlapped with a real space viewed by a user;
a recognition unit configured to recognize an image forming apparatus which exists in the real space viewed by the user;
an information obtaining unit configured to obtain job information indicating an execution state of a job input to the image forming apparatus recognized by the recognition unit; and
a control unit configured to instruct the AR display unit to display the augmented reality space in which a virtual paper corresponding to the job waiting to be processed is overlapped at a position corresponding to an actual paper feed tray of the image forming apparatus in which the job is executed, in accordance with the job information obtained by the information obtaining unit.

2. The job information display device of claim 1, wherein the control unit instructs the AR display unit to display the virtual paper corresponding to the job input by the user of the job information display device so as to be distinguished from the virtual paper corresponding to the job input by another user.

3. The job information display device of claim 2, wherein the control unit differentiates a color of the virtual paper corresponding to the job input by the user of the job information display device from a color of the virtual paper corresponding to the job input by the another user.

4. The job information display device of claim 2, wherein the control unit differentiates a shape of the virtual paper corresponding to the job input by the user of the job information display device from a shape of the virtual paper corresponding to the job input by the another user.

5. The job information display device of claim 1, wherein the control unit instructs the AR display unit to display the virtual paper so as to identify a border between the jobs.

6. The job information display device of claim 1, wherein the control unit instructs the AR display unit to display the virtual paper corresponding to the job waiting to be processed, so as to be overlapped with a paper feed tray of paper used in the job.

7. The job information display device of claim 6, wherein the control unit instructs the AR display unit to display information indicating number of sheets used for printing in the job waiting to be processed, by adding the information indicating the number of the sheets to the virtual paper corresponding to the job waiting to be processed.

8. The job information display device of claim 6, wherein in case that there are a plurality of the jobs waiting to be processed in the image forming apparatus, the control unit instructs the AR display unit to display the virtual papers corresponding to the jobs waiting to be processed, so as to arrange the virtual papers in an order of an execution of the jobs waiting to be processed.

9. The job information display device of claim 1, wherein the control unit instructs the AR display unit to display a virtual paper passage which virtually indicates the paper passage of the image forming apparatus.

10. The job information display device of claim 1, wherein the job information display device is a head-mounted display device.

11. A job information display device comprising:
an AR display unit configured to display an augmented reality space in which an image is overlapped with a real space viewed by a user;
a recognition unit configured to recognize an image forming apparatus which exists in the real space viewed by the user;
an information obtaining unit configured to obtain job information indicating an execution state of a job input to the image forming apparatus recognized by the recognition unit; and
a control unit configured to instruct the AR display unit to display the augmented reality space in which a virtual paper corresponding to the job in which printing is completed is overlapped at a position corresponding to an actual paper discharge tray of the image forming apparatus in which the job is executed, or at a position corresponding to a vicinity of the actual paper discharge tray, in accordance with the job information obtained by the information obtaining unit.

12. The job information display device of claim 11, wherein the control unit deletes the virtual paper corresponding to the job in which the printing is completed, after predetermined time elapses since an execution of the job is completed.

13. A job information display device, comprising:
an AR display unit configured to display an augmented reality space in which an image is overlapped with a real space viewed by a user;
a recognition unit configured to recognize an image forming apparatus which exists in the real space viewed by the user;
an information obtaining unit configured to obtain job information indicating an execution state of a job input to the image forming apparatus recognized by the recognition unit, the job information including position information of paper to be used in the job; and
a control unit configured to instruct the AR display unit to display the augmented reality space in which a virtual paper corresponding to the paper which is currently conveyed and is used in the job which is currently executed is overlapped at a position corresponding to the paper which is currently conveyed, on a paper passage of the image forming apparatus in which the job is executed, in accordance with the job information obtained by the information obtaining unit.

* * * * *